Jan. 2, 1934. C. ROSELLINI 1,941,580
COOKER
Filed Jan. 28, 1933 3 Sheets-Sheet 1
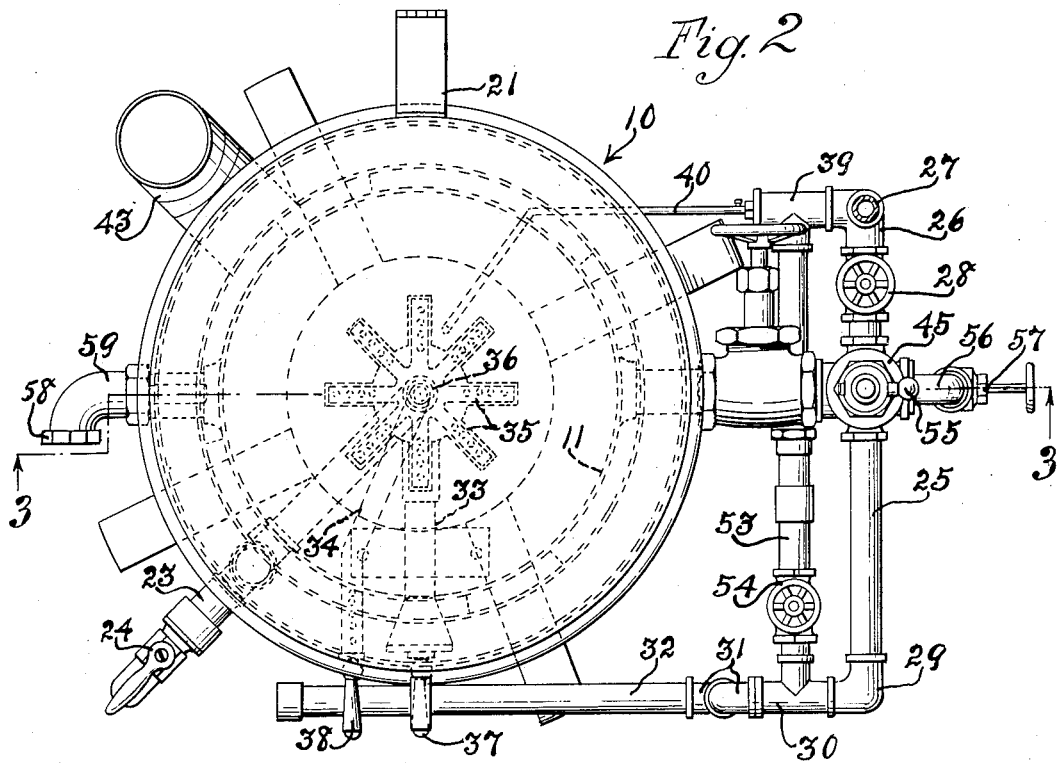
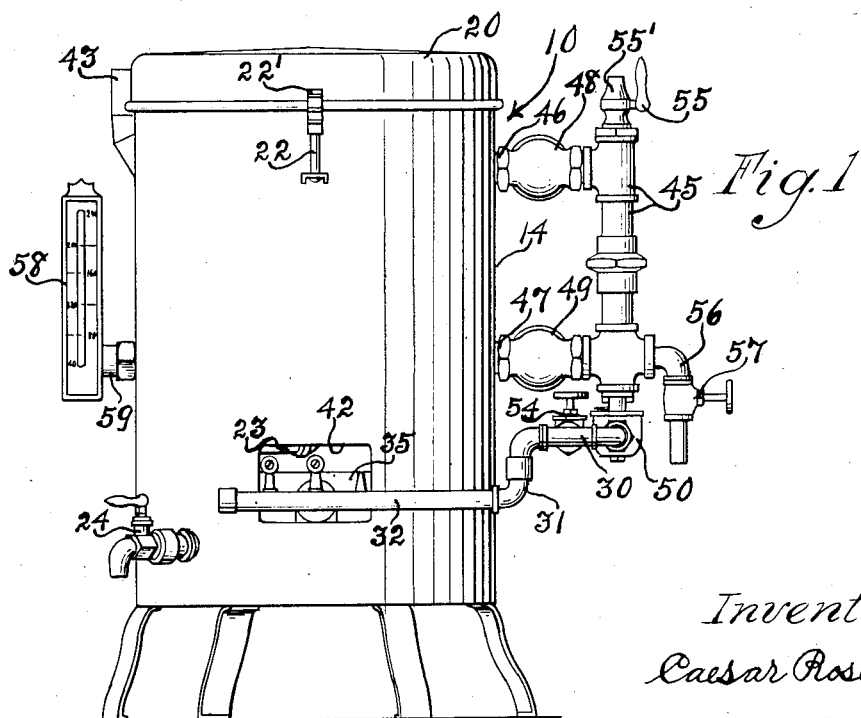
Inventor
Caesar Rosellini
by J. Daniel Stuwe
Attorney.

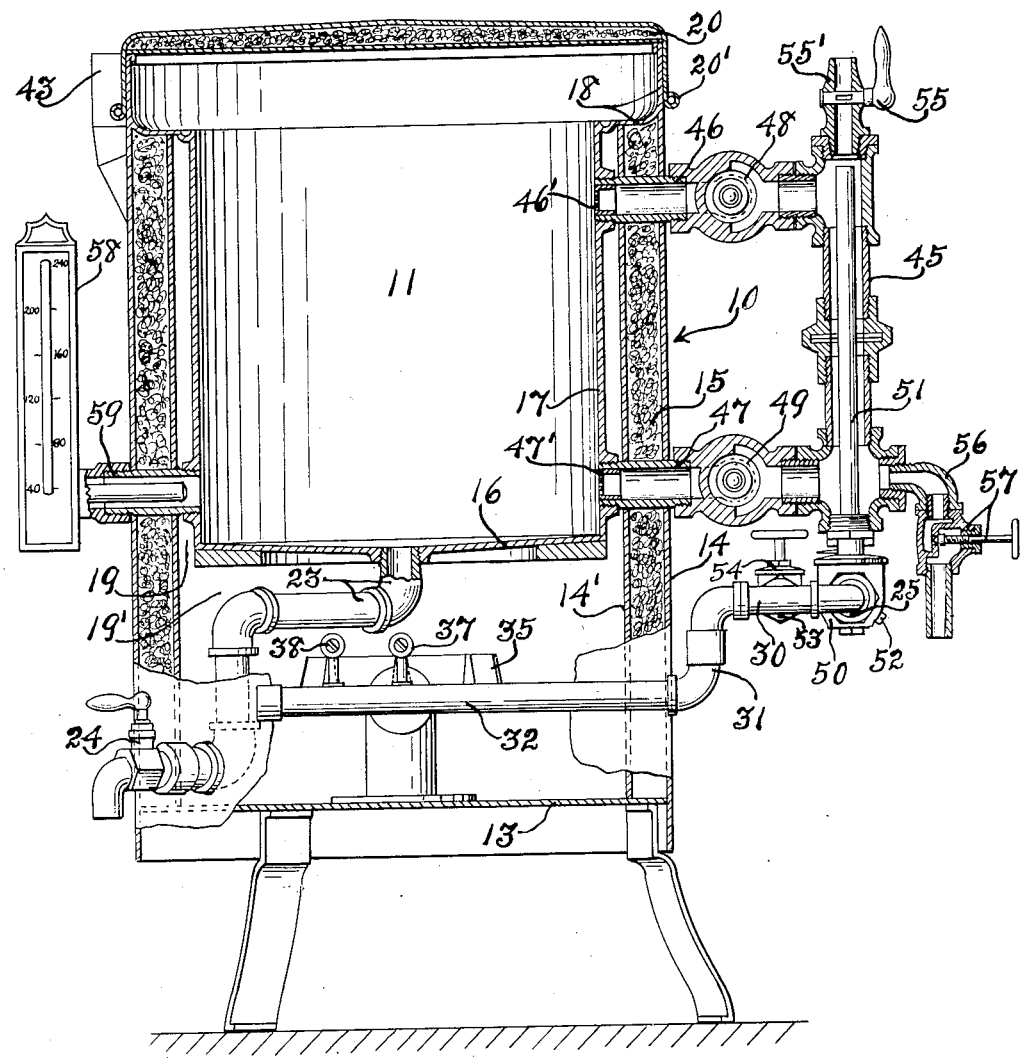

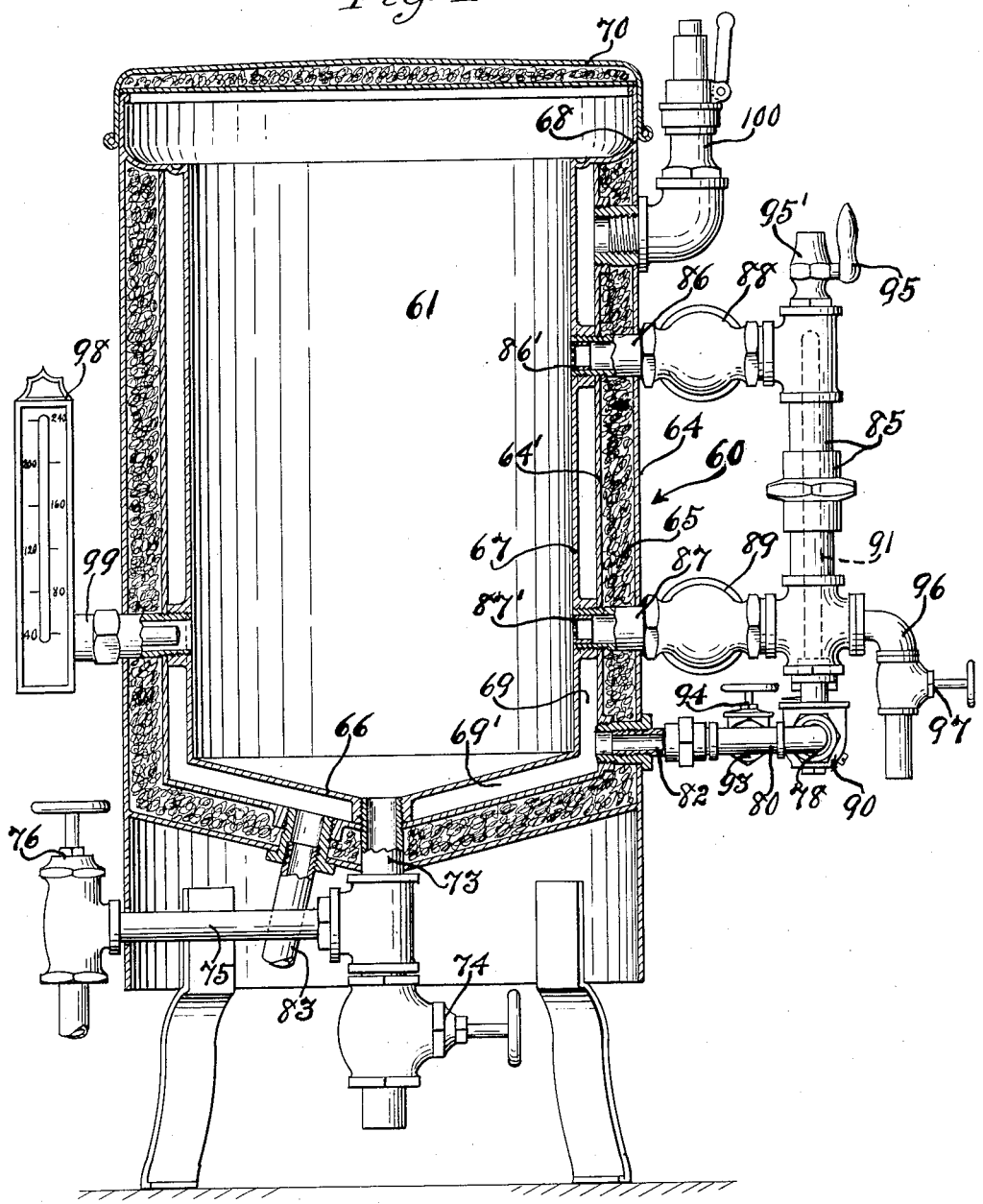

Patented Jan. 2, 1934

1,941,580

UNITED STATES PATENT OFFICE 1,941,580

COOKER

Caesar Rosellini, Chicago, Ill.

Application January 28, 1933. Serial No. 654,074

11 Claims. (Cl. 53—1)

This invention relates to improvements in cookers; and more particularly to such as are employed for cooking meats and other similar articles of food.

One of the main objects of this invention is to provide a cooker of this character which is especially adapted for cooking meats and the like, and which is highly efficient in maintaining the proper temperature, and at the same time is very economical in use.

A further object is to provide an efficient cooker wherein the supply of heating medium is automatically controlled, so that the proper temperature will be maintained evenly at all times, and a considerable saving will be effected in the heating medium employed for operating this cooking device.

Another object is to provide a cooker which comprises means for automatically controlling the influx of heating fluid supplied thereto, and wherein the control means is operated by the liquid which is heated in and circulates from the cooking receptacle or pot of the cooker, whereby the heat of the liquid and material which is being cooked in said receptacle will be steadily and automatically maintained at the exact temperature desired.

Still another object is to provide a cooker of this type which includes thermostatic control means equipped with bypass means, so that the heat of the receptacle and the material therein may be automatically maintained at a selected even temperature, or may also be admitted uncontrolled and in stronger volume to more promptly raise the temperature in the receptacle to the desired degree.

These and various other objects and advantages will become apparent from the following description, taken in connection with the accompanying drawings, in which the invention is shown in its preferred forms, it being understood that various other arrangements and forms of construction may be resorted to for carrying out the objects and purposes of this invention.

In the drawings:

Fig. 1 is a side elevation of a cooker embodying my invention in its preferred form of construction.

Fig. 2 is a plan view thereof.

Fig. 3 is a vertical sectional view, taken on line 3—3 of Fig. 2.

Fig. 4 is a vertical sectional view of a modified form of construction.

In the cookers and cooking vessels of this type now in use, the heating medium is generally applied to the bottom of the vessel or pot wherein the material is being cooked, and the stream of the supplied heating medium is then allowed to escape laterally outwardly from the bottom and along the sides of the vessel, being thereby dissipated to a large extent, entailing considerable waste in the heating medium supplied. Furthermore, the supply of heating medium to such cooker or cooking vessel is generally controlled and regulated by hand by the attendant, thus requiring the presence and care of an attendant and the expenditure of the time and effort of such person, thereby entailing further expense for operating the cooker, which usually amounts to a considerable sum, especially where such cooker or cooking vessel is continuously used and heated.

It is the object and purpose of my present invention to provide a cooker wherein the heat is constantly maintained at the selected proper temperature, whereby considerable economy is effected in the supply of heating medium, and so the previously required presence and services of an attendant is obviated.

For the purpose of illustration, I have shown my invention in the drawings embodied in two of its various forms of construction. In either of these forms my improved cooker comprises an insulated main or outer casing, and an inner receptacle or cook pot mounted therein for containing the liquid and material to be cooked, the receptacle being spaced inward of the casing to provide a heating chamber therebetween which extends around the bottom and also entirely around the vertical wall means of the pot or receptacle. A supply conduit conveys a fluid medium into said chamber for providing a heating medium therein to extend and to be maintained entirely around the bottom and vertical wall means of said receptacle; and thermostat means is provided and is controlled by the liquid which is heated in the receptacle, in such a manner as to maintain the liquid and the material in the receptacle automatically and continuously at the selected temperature.

The form of my invention illustrated in Figs. 1 to 3 inclusive comprises a main outer casing 10 and an inner receptacle or pot 11 mounted therein for containing the liquid and material to be cooked. Said casing 10 comprises a bottom 13 and insulated wall means arising therefrom which preferably includes a pair of spaced concentric wall members 14 and 14' having an insulated medium 15, for example, of asbestos material, packed therebetween. The receptacle 11 is mounted concentric therein and includes a bottom 16 and vertical wall means 17 arising therefrom.

The vertical wall means 14 and 17 of the casing and receptacle are secured together or united airtight at their upper ends to provide a top portion 18 and whereby to support the receptacle in the casing; and the receptacle is suitably spaced inward from the casing to provide a suitable heat chamber therebetween which includes the cylindrical upper portion 19 between the wall means 14 and 17, and the lower portion 19' between the bottoms 13 and 16 of said casing and receptacle, as best indicated in Fig. 3 of the drawings.

A cover or top 20 is mounted upon the top portion 18 of the casing to cover the casing and receptacle. It is preferably hinged on said portion by the use of means 21 at one part thereof, and is held securely closed to provide an airtight closure for the receptacle, by the use of latch means 22 provided on the part opposite hinge means 21 and arranged to catch with its hook part 22' over the peripheral rim 20' of the cover.

A discharge conduit 23 extends from the bottom of the receptacle outwardly to the outside of the casing, and a control valve 24 is provided at the outer end thereof.

The means provided for conducting the heating medium or fluid to the heat chamber in this form of my invention, as best shown in Fig. 2, comprise a conduit 25 having an elbow 26 at its inlet end provided with a receiving conduit or nipple 27 for receiving the supply of fluid, for example gas, from a suitable source of supply, a control valve 28 being provided in conduit 25 adjacent elbow 26. An elbow 29 is provided on the other end of the conduit 25 to which a T-member 30 is connected which in turn is connected through elbow means 31 with a feed conduit 32, and from the latter a larger feed pipe 33 and a smaller feed pipe 34 extend respectively to a larger burner 35 mounted centrally in the heating chamber portion 19' and to a smaller burner mounted centrally within said larger burner, valve control means 37 and 38 being provided for said feed pipes 33 and 34 to selectively admit or exclude the supply of gas or heating fluid to either one or to both of said burners. A T-member 39 extends from elbow 26 opposite T-member 30, and a pipe 40 extends therefrom having an opening at its free end positioned adjacent the burners, to provide a suitable pilot light. Pipes 33 and 34 extend through air inlet opening 42 in the lower part of casing, and an exit port 43 at the top of the casing emits the burnt gases.

Automatic heat control means or thermostatic means is provided to maintain the liquid and material in the receptacle constantly at the selected temperature, and this means comprises a housing 45 which is tubular in form and arranged vertical alongside the casing. A pair of conduits 46 and 47 connect the interior of said housing with the interior of the receptacle, at the upper and lower parts thereof, and control valves 48 and 49 are provided in said conduit, which are opened when the control means is utilized and which are closed when it is placed idle. A thermostat member 50 of suitable construction is secured to the lower end of tubular housing 45, and includes an actuating member, for example an expansible stem 51 extending upwardly within the housing and being normally immersed in the fluid therein which circulates from the receptacle through conduits 46 and 47 and through said housing. Said member 50 is also interposed in supply conduit 25, and the usual control means provided in said member is automatically actuated by the expansion of stem 51 for controlling the size of the channel and thereby the flow of heating fluid through said conduit 25, as is well understood, said member including adjusting means 52.

Strainer means 46' and 47' are preferably provided on conduits 46 and 47, to prevent entry of solids from the receptacle into the conduits and housing, and are removable for cleaning purposes.

A bypass is provided for passing the supply fluid around said thermostat means, whenever the use of the latter is not desired, and this bypass includes a conduit 53 which connects T-members 30 and 39, and a control valve 54 is provided therein. An air vent member 55' with valve means 55 therein is provided at the upper end of housing 45, and a discharge member 56 with a control valve 57 therein is provided at the lower end of said housing, adapted to drain the housing.

When the thermostat means or the control means is utilized, during the usual operation of the cooker, the valves 28, 48 and 49 are opened, while valves 54, 55 and 57 are closed; whereupon the heated fluid from the receptacle circulates through conduits 46, 47 and housing 45, and actuates stem 51 and the thermostat means interposed in the supply conduit 25. However, when it is desired to operate the cooker without the use of the automatic control means, as when the heat in the receptacle is to be rapidly increased, or when the thermostat is to be repaired, etc., then valve 28 and valves 48 and 49 are closed, and valve 54 in the bypass is opened, whereupon the supply fluid will pass from inlet means 27 to bypass conduits 53 to the burners, and the thermostat and valve 28 will be shut-off. In the meantime, valves 55 and 57 are preferably opened so that the fluid in housing 45 will be drained therefrom.

A thermometer 58 is preferably mounted on the casing, by the use of a tube 59, which communicates with the interior of the receptacle.

In Fig. 4 of the drawings I have shown this invention embodied in another form of construction, which is adapted for utilizing steam or some hot fluid for the heating medium or heating fluid, instead of the fuel gas, for which the above described form has been arranged and adapted.

In this modified form, in a similar manner as in the preceding one, the cooker comprises an outer casing 60 and a receptacle or pot 61 mounted therein for receiving the liquid and material to be cooked. Said casing 60 comprises a bottom 63 including an inner wall member 63' spaced inward from the outer one, and vertical wall means including a pair of spaced concentric wall members 64 and 64' extending upwardly from said bottom members 63 and 63', insulating material 65, such as asbestos, being packed between said spaced members of the bottom and the vertical wall means. The receptacle is mounted concentric therein and includes a bottom 66 and vertical wall means 67 arising therefrom.

The vertical wall means of the casing and receptacle are secured together airtight and steamtight at their upper ends and provide a united top portion 68, supporting the receptacle in the casing. The receptacle is spaced inward from the casing thereby providing a heat chamber between them which includes a cylindrical upper portion 69 between the the wall means 64 and 67, and a lower conical portion 69' between the bottoms 63 and 66 of the casing and receptacle, as indicated in Fig. 4 of the drawings.

An insulated cover or top 70 is mounted upon the top portion 68 of the casing to provide an airtight cover for the receptacle, and it is preferably mounted airtight on the top portion 68, in the manner disclosed in the preceding form.

In this form of construction the receptacle is provided with a discharge conduit 73 extending from the center of its bottom to the outside of the casing, and being provided with a control valve 74 at its outer portion.

This modified form also includes an inlet conduit 75 which is joined to discharge conduit 73 and is provided with a control valve 76. This arrangement enables supplying fresh water or liquid into the receptacle through inlet conduit 75 and conduit 73 at the bottom of the receptacle, instead of requiring the liquid to be poured in through the top of the latter.

The means provided herein for conducting the heating medium or fluid, such as steam or other hot fluid means, to the heat chamber, comprises a set of valve controlled conduit members, which are the same as those included in the preceding form by the members 25 to 32 inclusive, and in the present form include a supply conduit 78, like the above described supply conduit 25, from which extends a T-member 80 connected to a feed conduit 82 which is mounted in the casing walls and opens into the heating chamber 69, preferably so as to feed the steam or hot fluid into the lower part thereof. A return conduit 83 is preferably provided in the lower part of the casing for returning the cooled and condensed steam from the heat chamber to the source of supply.

Automatic heat control means in this form, preferably like in the preceding form, comprises a tubular housing 85 having its interior connected with the interior of the receptacle by a pair of conduits 86 and 87 provided with control valves 88 and 89 which are opened when the automatic control means is utilized, and are closed when the same is placed idle. A thermostat member 90 is secured in the lower end of tubular housing 85 and includes an expansible stem 91 extending within the housing and being normally immersed in the liquid which circulates from the receptacle through conduits 86 and 87 and through the housing. Said member 90 is interposed in said supply conduit for controlling the size of the opening therein and the flow of heating fluid therethrough, substantially as described in the preceding form.

Strainer means 86' and 87' are preferably provided on conduits 86 and 87 and are removable, for preventing clogging of said conduits by solids from the receptacle.

A bypass is also provided herein for conveying the supply fluid around the thermostat means, the same including a conduit 93 having a control valve 94 therein, substantially the same as conduit 53 and valve 54 in the preceding form.

An air vent 95' with a control valve 95 therein is provided at the upper end of housing 85, and a discharge member 96 with a control valve 97 therein is provided at the lower end of the housing, adapted for draining and also for flushing out the same.

A thermometer 98 is preferably mounted on the casing by the use of a tube 99 communicating with the interior of the receptacle; and a safety valve 100 is preferably also provided at the upper end of the heating chamber or steam chamber 69, to prevent accident through excessive pressure in this heating chamber, which is arranged steamtight all around the bottom and side wall means of the receptacle.

I claim as my invention:

1. A cooker comprising an outer casing and an inner receptacle mounted therein and spaced therefrom to provide a heat chamber between the walls of the two, heating means, including a conduit to conduct fluid to said casing and chamber, whereby to heat said chamber and receptacle, and control means comprising a housing having conduit means connecting its interior with the interior of said receptacle and having means actuated by the heated material from said receptacle whereby to automatically control the supply of fluid passing through said fluid conduit to said chamber.

2. A cooker comprising a main outer casing and a receptacle therein, each containing a bottom and vertical wall means, the two wall means being secured together at the upper ends, providing a heating chamber between said bottoms and said wall means, means to heat said receptacle, including a fluid supply conduit entering said casing and chamber, a housing having communication with the interior of said receptacle for circulation of means heated therein, and control means on said housing actuated by the means heated in said receptacle for automatically controlling the entry of fluid through said supply conduit.

3. A cooker comprising a casing and a fluid receptacle supported therein and spaced therefrom to provide a heat chamber between the walls of the two, means to heat said chamber and receptacle, including conduit means for conducting fluid into the chamber, thermostat means for regulating the supply of fluid passing through said conduit means, a pair of valve controlled conduits connecting the interior of the receptacle with the interior of said housing, whereby the fluid of the former actuates the regulating means of the latter, and a branch conduit on said conduit means for providing a bypass around said housing, to facilitate operating the cooker with the thermostat excluded.

4. A cooker comprising an insulated outer casing and a liquid receptacle mounted therein and spaced therefrom, the two being secured together at the upper ends of their walls, thereby providing a heat chamber between the walls and bottoms thereof, means to heat the receptacle, including a conduit to conduct a heating fluid to said chamber, a tubular housing and a pair of conduits connecting the interiors of said housing and said receptacle at the upper and lower parts thereof, and control means on the housing to regulate the flow of fluid in the supply conduit and actuated by the heated liquid from the receptacle, whereby to maintain the liquid and material in said receptacle at an even temperature.

5. A cooker comprising an insulated outer casing and a liquid receptacle mounted therein, each having a bottom and vertical wall means and the two wall means being secured together at the upper ends, providing a heat chamber between said bottoms and wall means, means to heat the receptacle, including a burner mounted between said bottoms, a conduit to conduct fluid fuel to said burner, a housing and conduits connecting its interior with the interior of the receptacle, and control means for controlling the fluid in said fuel conduit including means connected with the housing and actuated by the heated liquid from said chamber, for operating said control means and maintaining an even temperature in the material in said receptacle.

6. A cooker comprising an insulated outer casing and a receptacle adapted to contain liquid mounted therein, the upper ends of the two being secured together and the bodies being spaced apart to provide a closed steam chamber therebetween, a supply conduit leading into said casing to conduct steam into said chamber, thermostat means interposed in said supply conduit, conduit means connecting the interior of said receptacle with the thermostat means to operate the latter by the liquid from the receptacle and automatically regulate the supply of steam in said supply conduit, a steam return conduit leading from the lower end of the chamber, and a safety valve provided at the upper part of said chamber.

7. A cooker comprising an insulated outer casing and a receptacle mounted therein, the two being secured together at the upper ends and the bodies being spaced apart to provide a heat chamber therebetween, means to heat said receptacle, including conducting means to convey heating fluid into said chamber, thermostat means connected to said fluid conducting means, conduit means connecting the interior of said receptacle with the thermostat means to operate the latter by the heated liquid from the receptacle, whereby the liquid and material in said receptacle are maintained automatically and constantly at the selected temperature, and strainer means on said conduit means to prevent clogging thereof by solid material from the receptacle.

8. A cooker comprising an outer casing and a receptacle mounted therein, the two being secured together at the upper ends and the bodies being spaced apart to provide a heat chamber therebetween, a member mounted in the lower part of said chamber to distribute heat around the receptacle, conducting means to conduct heating medium to said distributing member, a thermostat interposed in said conducting means, and conduit means connecting the interior of said receptacle with the thermostat to operate the latter by the heated fluid from the receptacle, whereby the fluid in said receptacle is maintained automatically and constantly at the selected temperature.

9. A cooker comprising an insulated casing and a receptacle concentrically mounted therein, the two being secured together at their upper ends and their bodies being spaced apart thereby providing a heat chamber therebetween, a burner mounted in the lower part of said chamber, an air opening on said casing adjacent said burner, a supply conduit having means extending through said opening to said burner to conduct fluid fuel thereto, an outlet vent at the upper part of said chamber, thermostat means interposed in said fuel supply conduit, and conduit means connecting the interior of said receptacle with the thermostat to operate the latter by the liquid circulating from said receptacle, whereby the liquid and material in said receptacle are maintained automatically and constantly at the selected temperature.

10. A cooker comprising a fluid receptacle and a surrounding casing to provide a heat chamber therebetween, heating means including means to conduct a heating medium to said chamber whereby to heat the receptacle, and control means including a container communicating with the interior of said receptacle and having means actuated by the fluid heated in the receptacle, for automatically controlling the supply of heating medium to said chamber.

11. A cooker comprising a casing and a receptacle mounted therein and providing a heat chamber therebetween, heating means including conduit means for conducting heating fluid to said chamber whereby to heat said receptacle, and control means including a container communicating with the interior of said receptacle and having means thereon actuated by the heated material circulating from the receptacle, whereby to automatically control the supply of heating fluid to said chamber and maintain an even temperature in the receptacle.

CAESAR ROSELLINI.